(12) United States Patent
Jung et al.

(10) Patent No.: US 8,839,362 B2
(45) Date of Patent: Sep. 16, 2014

(54) METHOD AND APPARATUS FOR MANAGING TRANSMIT POWER FOR DEVICE-TO-DEVICE COMMUNICATION

(71) Applicant: Motorola Mobility LLC, Libertyville, IL (US)

(72) Inventors: Hyejung Jung, Palatine, IL (US); Vijay Nangia, Algonquin, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 13/782,190

(22) Filed: Mar. 1, 2013

(65) Prior Publication Data

US 2013/0178221 A1 Jul. 11, 2013

(51) Int. Cl.
*G06F 7/04* (2006.01)

(52) U.S. Cl.
USPC .......................................................... 726/2

(58) Field of Classification Search
None
See application file for complete search history.

(56) References Cited

U.S. PATENT DOCUMENTS

| | | | |
|---|---|---|---|
| 7,610,027 B2 | 10/2009 | Alapuranen | |
| 7,620,370 B2 | 11/2009 | Barak et al. | |
| 8,068,454 B2 | 11/2011 | Bonta et al. | |
| 2004/0219920 A1* | 11/2004 | Love et al. | 455/442 |
| 2007/0111681 A1 | 5/2007 | Alberth, Jr. et al. | |
| 2008/0130728 A1 | 6/2008 | Burgan et al. | |
| 2012/0028672 A1 | 2/2012 | Chen et al. | |

FOREIGN PATENT DOCUMENTS

| | | |
|---|---|---|
| WO | 2008034044 A2 | 3/2008 |
| WO | 2009026031 A2 | 2/2009 |

OTHER PUBLICATIONS

Gabor Fodor and Norbett Reider, "A Distributed Power Control Scheme for Cellular Network Assisted D2D Communications", Proceedings of the Global Communications Conference, GLOBECOM 2011, Dec. 5-9, 2011, Houston, Texas, USA, all pages.
Doppler, Klaus et al: "Device-to-Device Communication as an Underlay to LTE-Advanced Networks", IEEE Communications Magazine, Dec. 2009, pp. 42-49.
Pekka Janis et al.: "Device-to-Device Communication Underlaying Cellular Communications Systems", Int'l J. of Communications, Network and System Sciences, vol. 02, No. 03, Jan. 1, 2009, pp. 169-178.
Patent Cooperation Treaty, International Search Report and Written Opinion of the International Searching Authority for International Application No. PCT/US2014/013484, Mar. 20, 2014, 11 pages.

* cited by examiner

*Primary Examiner* — Brandon Hoffman

(57) ABSTRACT

A method and apparatus for managing transmit power for device-to-device communication is provided. According to an embodiment of the invention, a UE uses a component carrier of one cell to engage in D2D communication. In parallel with its D2D communication, the UE uses one or more other component carriers of one or more other cells to engage in cellular communication. The UE configures its D2D transmit power as well as its cellular transmit power so that its total transmit power does not exceed the UEs maximum power limit, and so that the transmit power on a component carrier of a cell does not exceed the maximum power limit for the cell that provides the component carrier.

2 Claims, 10 Drawing Sheets

METHOD AND APPARATUS FOR MANAGING TRANSMIT POWER FOR DEVICE-TO-DEVICE COMMUNICATION

TECHNICAL FIELD

The disclosure relates to device-to-device communication in a wireless network.

BACKGROUND

The demand for data capacity in wireless networks has increased dramatically with the widespread use of smartphones and tablet computers. In addition to traditional voice services, consumers now expect to be able to use their wireless devices to watch streaming video, often in a high-definition format, play on-line games in real-time, and transfer large files. This has put additional load on wireless networks and, in spite of advances in cellular technology (e.g., the deployment of 4G networks, the use of newer versions of the IEEE 802.11 family of standards), capacity is still an issue that providers have to consider.

DESCRIPTION

Figure 1:
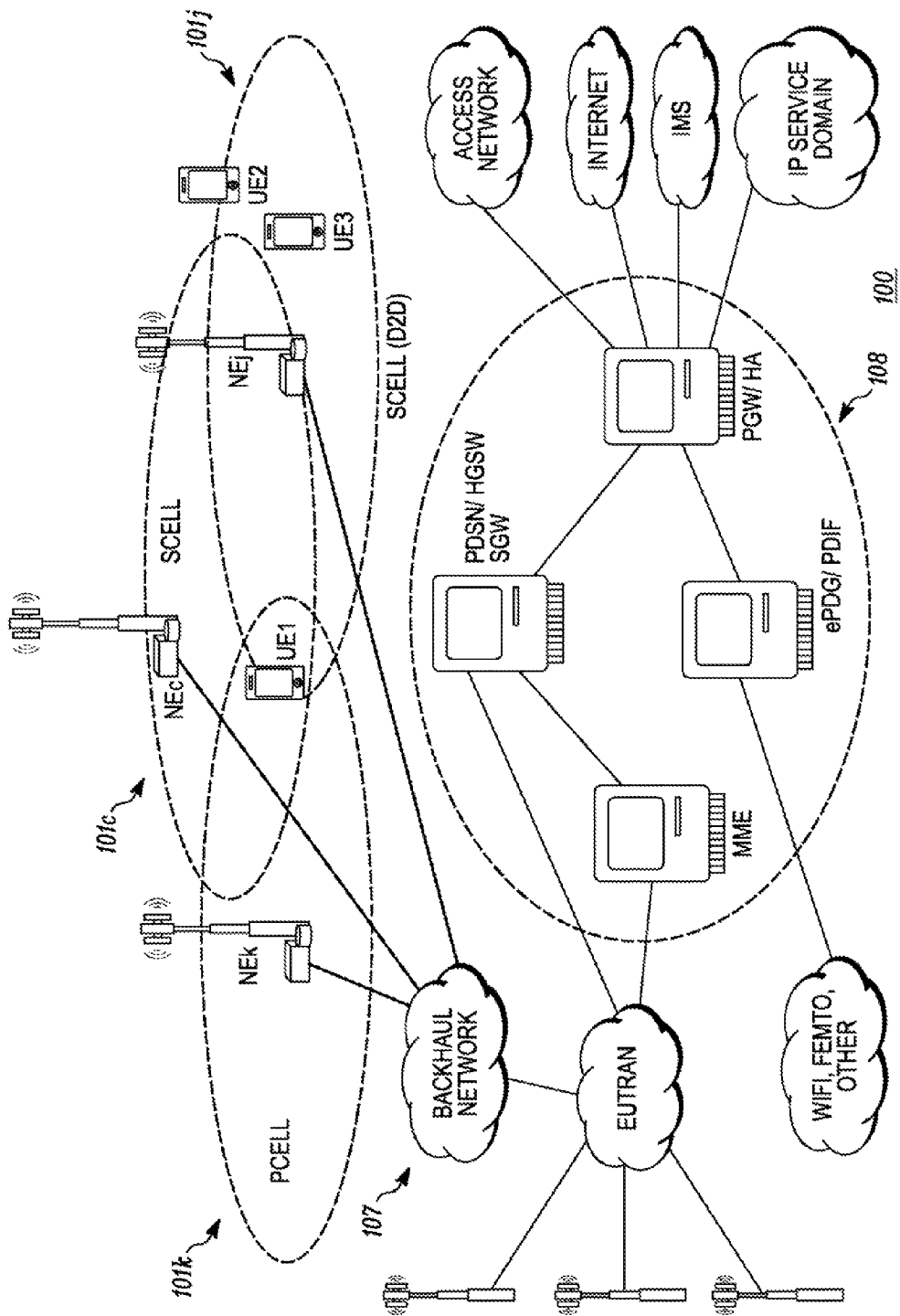
FIG. 1 is an example of a communication system in which various embodiments of the invention may be implemented.

Cellular networks such as LTE and UMTS have traditionally operated on a model in which the network controls radio communications, and communication between UEs passes through the network. Thus, it normally requires at least two hops on the cellular network for data to get from a first UE to a second UE, and more hops if routing is necessary. Multiple hops may even be required when the two UEs are connected to the same cell.

In Device-to Device (D2D) communication, however, UEs communicate directly with one another without the cellular network acting as an intermediary. Data therefore travels from the first UE to the second UE with only one hop.

Introducing D2D communication on top of CA (Carrier Aggregation) presents challenges. When a cellular network employs carrier aggregation, a UE communicates using multiple component carriers. The UE typically regulates its transmit power on the different carriers so as to avoid exceeding a maximum allowable transmit power, e.g., a per-UE maximum or a per-cell maximum. In D2D communication, the UE also needs to ensure that it transmits to other UE(s) (i.e., UEs that are also participating in D2D communication) at an appropriate transmit power In accordance with the foregoing, a method and apparatus for managing transmit power for device-to-device communication is provided. According to an embodiment of the invention, a UE uses a component carrier of one cell, to engage in D2D communication. In parallel with its D2D communication, the UE uses one or more other component carriers of one or more other cells to engage in cellular communication. The UE configures its D2D transmit power as well as its cellular transmit power so that its total transmit power does not exceed the UEs maximum power limit, and so that the transmit power on a component carrier of a cell does not exceed the maximum power limit for the cell that provides the component carrier.

According to an embodiment of the invention, when a UE engages with D2D communication, it manages transmit power by determining a first configured maximum output power which is based on a configuration of a first cell), and a second configured maximum output power, (which is based on the configuration of the first cell and a configuration of a second cell).

If the UE determines that the total transmit power would exceed the second configured maximum output power, the UE determines a cellular transmit power based on one or more factors. Such factors include one or more of the following: the first configured maximum; output power; the second configured maximum output power; the relative priority of service of device-to-device communication and cellular communication; a guaranteed transmit power for device-to-device communication (up to a predetermined threshold maximum power reduction); a transmit power of a cellular uplink control channel; and a configured maximum output power for D2D transmission. The UE transmits a cellular signal on a carrier of the first cell at the determined cellular transmit power.

The UE may also determines a device-to-device transmit power based on one or more of the following factors: the first configured maximum output power; the second configured maximum output power; the relative priority of service of device-to-device communication and cellular communication (e.g., the priority of one or more of a cellular uplink control channel and a cellular uplink data channel that carries uplink control information); and a maximum power reduction to the configured maximum output power for D2D transmission. The UE transmits a device-to-device signal to a second UE on a carrier of the second cell at the determined device-to-device transmit power.

The cellular transmit power determined by the UE may be a cellular uplink data channel power. Furthermore, transmitting the cellular signal may involve transmitting a cellular data signal on the carrier of the first cell at the determined cellular uplink data channel transmit power; and transmitting the cellular control signal on the carrier of the first cell.

According to an embodiment of the invention, a UE receives (from a network entity) an indication (e.g., a command) to perform device-to-device communication on multiple uplink carriers, including a first uplink carrier, and determines a total configured maximum output power. The UE may determine the total configured maximum output power, which is based on maximum power requirements for configured serving cells that are associated with the uplink carriers. The UE transmits a device-to-device signal on the first uplink carrier. The UE determines the power of the device-to-device signal based on what the UE's total transmit power would be. If the total transmit power of the UE would exceed the total configured maximum output power, the UE transmits the D2D signal at a first transmit power level. If the total transmit power of the UE would not exceed the total configured maximum output power, the UE transmits the D2D signal at a second transmit power level.

The UE also transmits a set of cellular signals on one or more of the uplink carriers—other than the first uplink carrier—at a first set of transmit power levels if the total transmit power of the UE would exceed the total configured maximum output power, or at a second set of transmit power levels if the total transmit power of the UE would not exceed the total configured maximum output power. The UE may determine the first set of power levels based on whether there is a guaranteed transmit power for device-to-device communication up to a predetermined threshold. Additionally, the LIE may determine the first transmit power level of the device-to-device signal and the first set of transmit power levels of the set of cellular signals based on a maximum power reduction of a configured maximum output power for the D2D transmission.

In an embodiment of the invention, the total configured maximum output power is a first total configured maximum output power, and the UE determines a second total configured maximum output power, which is based on the maximum power requirements for the plurality of configured serving cells except a cell associated with the first uplink carrier. Furthermore, the first set of transmit power levels of the set of cellular signals may be based on one or more of the first and second total configured maximum output powers.

In an embodiment of the invention, the UE determines the first transmit power level of the device-to-device signal and the first set of transmit power levels of the set of cellular signals based on the priority of service of device-to-device communication relative to that of cellular communication.

Referring to FIG. 1, an example of a wireless communication network in which embodiments of the invention may be used will now be described. The network 100 is configured to use one or more Radio Access Technologies (RATs), examples of which include an E-UTRA, IEEE 802.11, and IEEE 802.16. The network 100 includes a first cell 101$k$, a second cell 101$j$, and a third cell 101$c$. First cell 101$k$ is managed by a first network entity NEk, second cell 101$j$ is managed by a second network entity NEj, and third cell 101$c$ is managed by a third network entity NEc.

Also shown in FIG. 1 are UE1, UE2, and UE3. Each of the UEs is in communication with the network 100 via one or more of the network entities, either in an active mode or an idle mode. Possible implementations of a UE include a mobile phone, a tablet computer, a laptop, and an M2M (Machine-to-Machine) device. Communication between a network entity and a UE typically occurs when the UE is located within the network entity's cell. For example, each of NEk, NEj, and NEc can transmit signals to and receive signals from UE1. NEj would typically communicate with UE2 and UE3. The term "cell" as used herein may refer the geographical area covered by a network entity, or may refer to the network entity itself. The context in which the term is used will indicate its meaning. For example, when a UE is said to be transmitting to a cell, it should be understood to mean that the UE is transmitting to the network entity that controls the cell. When a UE is said to be in a cell, for example, the term "cell" refers to the geographical area. In the geographical sense, a sector is a type of cell.

One or more of cells of FIG. 1 may be a virtual cell. A virtual cell is a cell that is created as a result of multiple network entities cooperating. A UE generally does not perceive any distinction between a virtual cell and a non-virtual cell. Possible implementations of cells 101$k$, 101$j$, and 101$c$ include a macrocell, a femtocell, a picocell, and a wireless access point.

The term "network entity" as used herein refers to hardware and software that operates as part of the infrastructure of a network. Examples include an E-UTRA base station, an eNB, a transmission point, a Remote Radio Head, an HeNB, a relay node, an 802.11 AP, and an IEEE 802.16 base station.

A network entity can be made of multiple network entities. For example, two base stations may operate in conjunction with one another to operate as a single network entity. A network entity may also mean a sub-portion of another network entity. For example, a base station (a network entity) may control multiple cells, each of which is controlled by certain resources of the base station. Each set of resources (e.g., each antenna array along with the equipment that controls it) may constitute a separate network entity.

In some embodiments of the invention, two or more cells are controlled by a single network entity, or by multiple network entities that coordinate with one another, e.g., when Carrier Aggregation (CA) or Coordinated Multipoint communication (CoMP) is being used.

The cells, network entities, and UEs of FIG. 1 are only representative, and are intended to facilitate description. In fact, the network 100 may have many cells and network entities and be in communication with many UEs. For example, if the network 100 is an LTE network, there are likely many eNBs controlling many macrocells, and many users may be moving within and between the macrocells, with their UEs connected to one or more of the macrocells.

Referring still to FIG. 1, the network 100 also includes a backhaul network 107. The backhaul network 107 includes wired and wireless infrastructure elements, such a fiber optic lines and wireless microwave links, that carry signals around various parts of the network 100, including among the cells. The network 100 also includes a core network 106 that controls the operation of the network 100 using various resources, including billing systems, home location registers, and internet gateways. Several core resources are depicted in FIG. 1. In an LTE implementation, resources of the core network 106 communicate with network entities over E-UTRAN, and with other networks.

Figure 2:
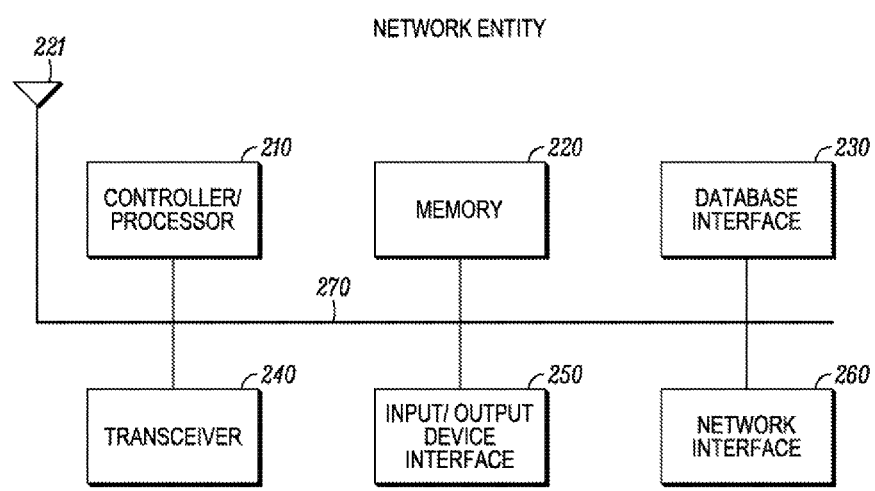
FIG. 2 is a block diagram depicting certain aspects of a network entity in accordance with an embodiment of the invention.

FIG. 2 illustrates a configuration of a network entity (from FIG. 1) in accordance with an embodiment of the invention. The network entity includes a controller/processor 210, a memory 220, a database interface 230, a transceiver 240, input/output (I/O) device interface 250, a network interface 260, and one more antennas, represented by antenna 221. Each of these elements is communicatively linked to one another via one or more data pathways 270. Examples of data pathways include wires, conductive pathways on a microchip, and wireless connections.

During operation of the network entity, the transceiver 240 receives data from the controller/processor 210 and transmits RF signals representing the data via the antenna 221. Similarly, the transceiver 240 receives RF signals via the antenna 221 converts the signals into the appropriately formatted data, and provides the data to the controller/processor 210. The controller/processor 210 retrieves instructions from the memory 220 and, based on those instructions, provides outgoing data to, or receives incoming data from the transceiver 240. If needed, the controller/processor can retrieve from a database, via the database interface 230, data that facilitates its operation.

Referring still to FIG. 2, the controller/processor 210 transmits data to other network entities of the network 100 (FIG. 1) via the network interface 260, which is coupled to the backhaul network 107. The controller/processor 210 can also receive data from and send data to an external device, such as an external drive, via the input, output interface 250.

The controller processor 210 may be any programmable. processor. The controller/processor 210 may be implemented, for example, as a general-purpose or special purpose computer, a microprocessor (e.g., a programmed microprocessor), peripheral integrated circuit elements, application-specific integrated circuit or other integrated circuits, hardware/electronic logic circuits, such as a discrete element circuit, a programmable logic device, such as a programmable logic array, field programmable gate-array.

The memory 220 may be implemented in a variety of ways, including as volatile and nonvolatile data storage, electrical, magnetic optical memories, random access memory (RAM), cache, or hard drive, Data is stored in the memory 220 or in a separate database. The database interface 230 is used by the controller/processor 210 to access the database. The database may contain formatting data that allows the UE to connect to the network 100 (FIG. 1).

The I/O device interface 250 may be connected to one or more input devices such as a keyboard, mouse, pen-operated touch screen or monitor, or voice-recognition device. The I/O device interface 250 may also be connected to one or more output devices, such as a monitor, printer, disk drive, or speakers. The I/O device interface 250 may receive a data task or connection criteria from a network administrator.

The network connection interface 260 may be connected to a communication device, modem, network interface card, a transceiver, or any other device capable of transmitting signals to, and receiving signals from the network 100. The network connection interface 260 may be used to connect a client device to the network 100.

According to an embodiment of the invention, the antenna 221 is one of a set of geographically collocated or proximal physical antenna elements linked to the one or more data paths 270, each having one or more transmitters and one or more receivers. The number of transmitters that the network entity has is related, to the number of transmit antennas that the network entity has. The network entity may use the multiple antennas to support MIMO communication.

Figure 3:
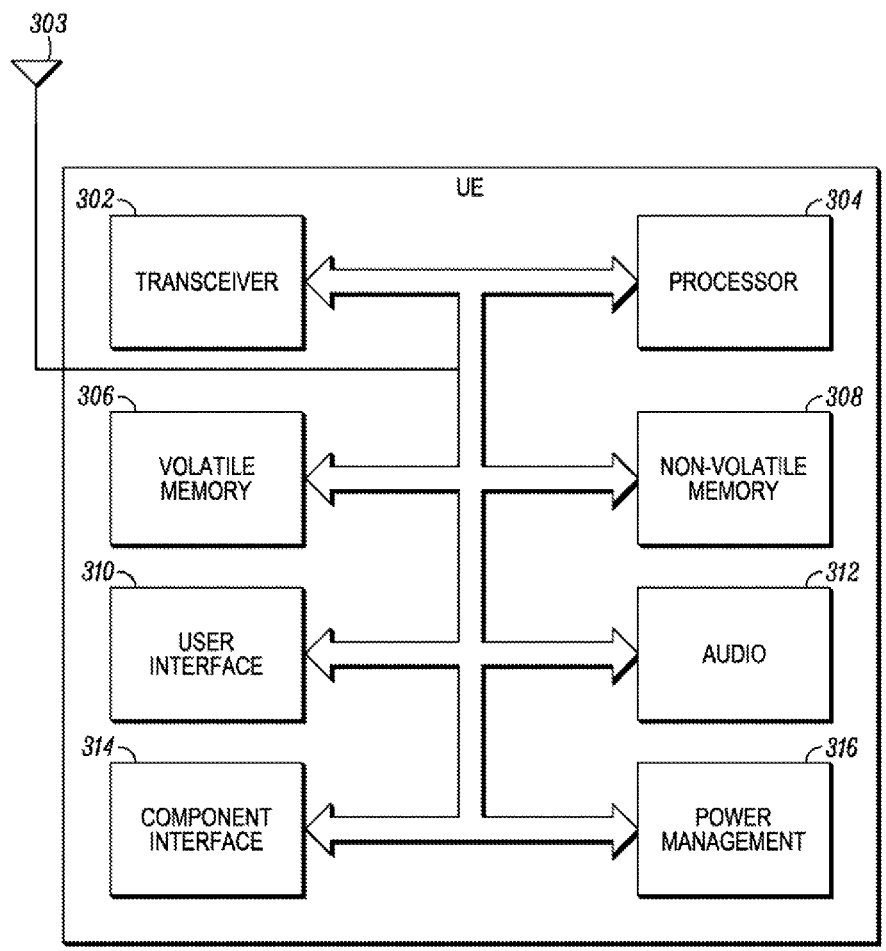
FIG. 3 is a block diagram depicting aspects of a UE in an embodiment of the invention.

FIG. 3 is a block diagram of a UE (such as one or more of the UEs depicted in FIG. 1) according to an embodiment of the invention. The UE includes a transceiver 302, which is capable of sending and receiving data over the network 100. The transceiver is linked to one or more antennas, represented by antenna 303, which may be configured like the one or more antennas of the network entity of FIG. 2. The UE may support MIMO.

The UE also includes a processor 304 that executes stored programs, as well as a volatile memory 306, and a non-volatile memory 308. The volatile memory 306 and the non-volatile memory 308 are used by the processor 304 in the same manner that the controller/processor 210 of the network entity uses the memory 220. The UE includes a user input interface 310 that may have elements such as a keypad, display, or touch screen. The UE also includes an audio interface 312 have elements such as a microphone, earphone, and speaker. The UE also includes a component interface 314 (e.g., a universal serial bus (USB) interface) to which additional elements may be attached. Finally, the UE includes a power management module 316. The power management module, under the control of the processor 304, controls the amount of power used by the transceiver 301 to transmit signals. The processor obtains the instructions and data e.g., power levels, a look-up table as described below) that it uses to control the power management module to perform tasks, such as setting the transmit power of the UE for cellular and/or D2D communication. The processor also controls the transceiver to obtain power (as managed by the power management module), and to transmit signals at those power levels.

During operation, the transceiver 302 receives data from the processor 304 and transmits RE signals representing the data via the antenna 303. Similarly, the transceiver 302 receives RE signals via the antenna 303, converts the signals into the appropriately formatted data, and provides the data to the processor 304. The processor 304 retrieves instructions from the non-volatile memory 308 and, based on those instructions, provides outgoing data to, or receives incoming data from the transceiver 302. If needed, the processor 304 can write to, or read from the volatile memory 306, particularly for caching data and instructions that the processor 304 requires in order for it to perform its functions.

In one embodiment, the user interface 310 includes a touch-sensitive display that displays, to the user, the output of various application programs. The touch-sensitive display depicts on-screen buttons that the user can press in order to cause the UE to respond. The content shown on the user interface 310 is generally provided to the user interface at the direction of the processor 304. Similarly, information received through the user interface 310 is provided to the processor, which may then cause the UE to carry out a function whose effects may or may not be apparent to a user.

In an LTE embodiment, the multiplexing or multiple access scheme used for communication between the network entities and the UEs differs depending on whether the signals are being sent in the UL direction (travelling from a UE to a network entity) or in the DL direction (travelling from a network entity to a UE). The multiple access scheme used in the DL direction is a multiple-access version of OFDM called Orthogonal Frequency-Division Multiple Access (OFDMA). In the UL direction, Single Carrier Frequency Division Multiple Access (SC-FDMA) or DFT-SOFDM is typically used. In an LTE implementation, the aggregated channel bandwidth of the UL or DL carriers varies depending upon whether CA is being used (e.g., up to 20 MHz without CA, or up to 100 MHz with CA).

Figure 4A:
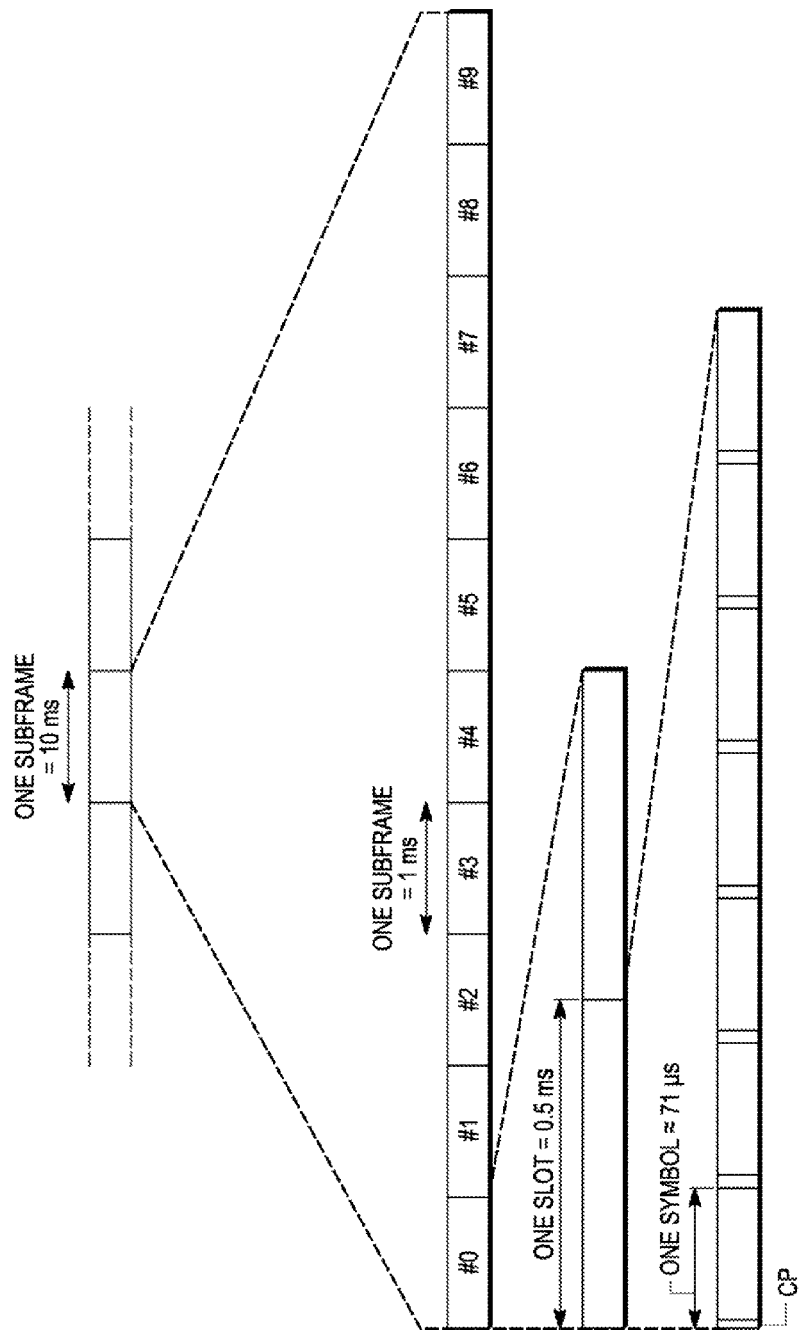
FIG. 4A is a frame structure according to an embodiment of the invention.
Figure 4B:
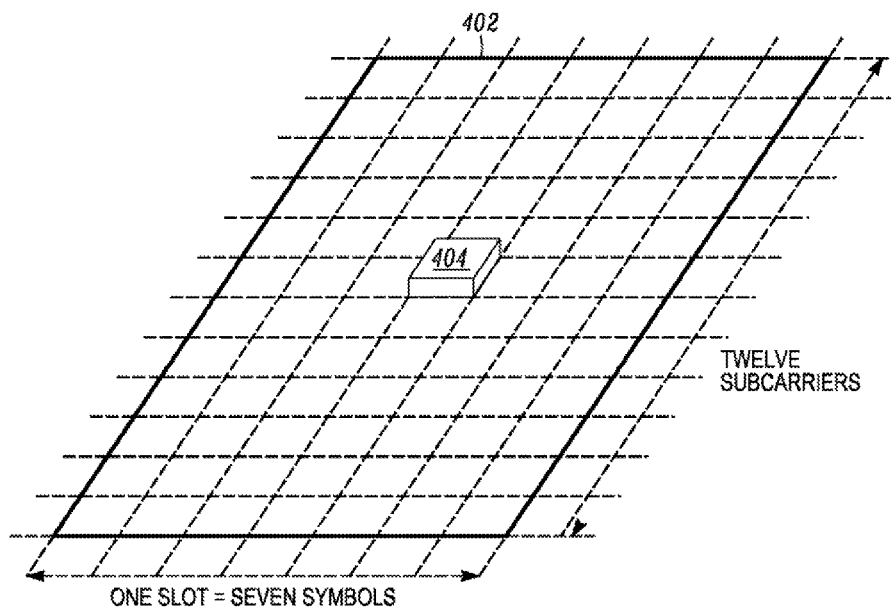
FIG. 4B is a resource block according to an embodiment of the invention.

Referring to FIG. 4, an LTE frame structure used for carrying data between the UEs and the network entities on both UL carriers and DL carriers according to an embodiment of the invention will now be described. In LTE operation, both uplink and downlink radio frames are each 10 milliseconds (10 ms) long, and are divided into ten subframes, each of 1 ms duration. Each subframe is divided into two slots of 0.5 ms each. Each slot contains a number of OFDM symbols, and each OFDM symbol may have a Cyclic Prefix (CP). The duration of a CP varies according to the format chosen (normal or extended CP), but is about 4.7 microseconds in the example of FIG. 4A, with the entire symbol being about 71 microseconds. In the context of time-frequency, the subframe is divided into units of RBs, as shown in FIG. 4B. When a normal CP is used, each RB 402 is 12 subcarriers by 7 symbols (one slot). Each RB (when a normal CP is used), in turn, is composed of 84 REs 404. Each RE is 1 subcarrier by 1 symbol. However, RBs and REs may be other sizes in other embodiments. Thus, the terms RE and RB include time-frequency resources of any size. In LTE, an RB or an RB pair is the typical unit to which resource allocations are assigned for uplink and downlink communications.

Figure 5:
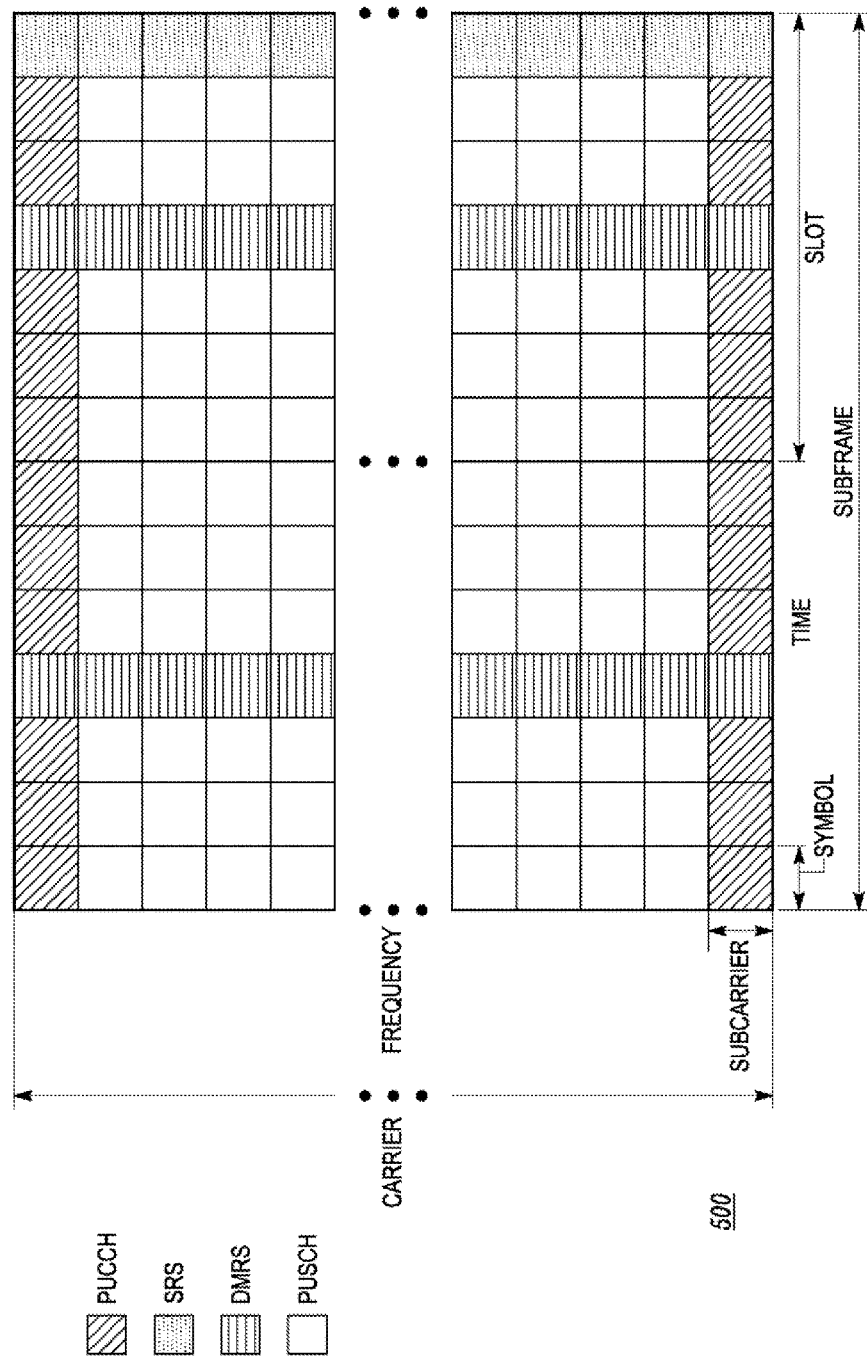
FIG. 5 is an uplink subframe according to an embodiment of the invention.

Referring to FIG. 5, an UL subframe structure used to carry data from UEs to network entities over an UL, carrier according to an LTE embodiment of the invention will now be described. In this embodiment, a UE transmits data and certain types of control information to a network entity on a Physical Uplink Shared CHannel (PUSCH). The UE transmits control information to a network, entity on a Physical Uplink Control CHannel (PUCCH). Data carried by the PUSCH includes user data, such as video data e.g., streaming video), or audio data (e.g., voice calls) A UE may also transmit control information on the PUSCH, such as HARQ-ACK feedback, CSI reports.

Each CSI report sent by a UE may include one or more of a CQI, a PMI, a PTI, and an RI. The UE uses the CQI to indicate the highest MCS that, if used, would result in DL transmissions having a BLER of no more than for example 10%. The UE uses the PMI to indicate, to the network entity, a recommended precoder matrix for DL transmissions. The RI is used by the UE to recommend the transmission rank (number of transmission layers) that should preferably be used for DL transmission to the UE. The PTI distinguishes slow fading environments from fast fading environments.

The control information transmitted by a UE on the PUCCH includes HARQ-ACK feedback, SR, and CSI reports. The UE sends HARQ-ACK feedback in order to ACK or NACK data that the UE receives from a network entity. An SR is used by the UE to request UL resources from the network, including from one or more network entities. CSI reports are used by a UE to report, to a network entity, information regarding the DL transmission channel as seen from the point of view of the UE.

A UE may transmit an UL DM-RS and/or SRS during communication with the network. The UL DM-RS is used by a network entity for channel estimation to enable coherent demodulation of the PUSCH and/or PUCCH. The SRS is used by the network entity for channel state estimation to support, for example, uplink channel-dependent scheduling and link adaptation.

in an embodiment of the invention, there are different PUCCH formats, but regardless of format a PUCCH generally carries control information from UEs to network entities. PUCCH resource blocks are typically located at the edges of the UL carrier, while the RBs in between the edges may be used for PUSCH resource assignment. In various embodiments of the invention described herein, a network entity can allocate resources of a PUCCH or a PUSCH to carry data from UE to UE in D2D communication.

Figure 6:
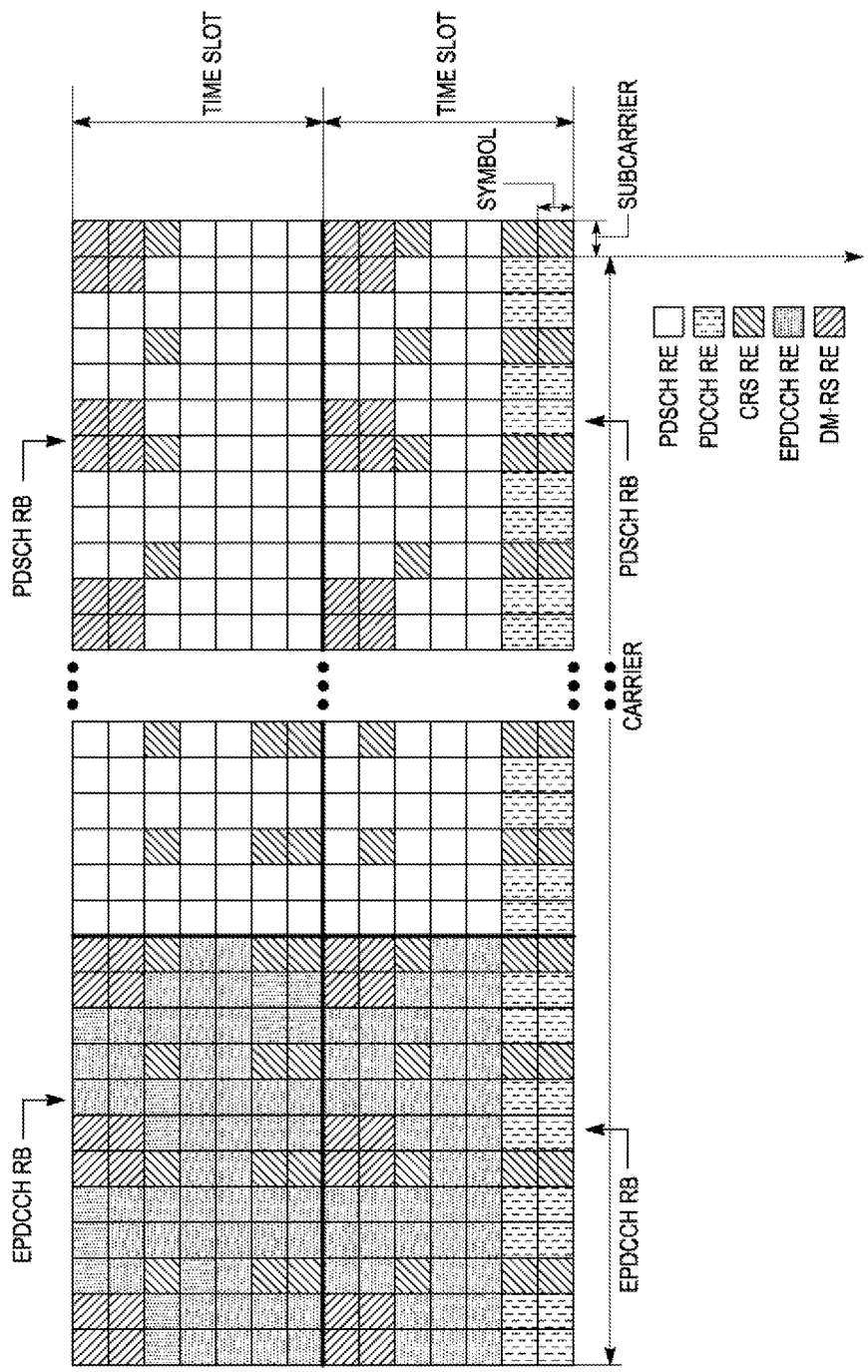
FIG. 6 is a downlink subframe according to an embodiment of the invention.

Referring to FIG. 6, a structure of a DL subframe used for carrying data from one or more network entities to a UE on a DL carrier will now be described. The frequency axis is divided into subcarriers. The time axis is divided into symbols. The subframe is divided into RBs.

A network entity transmits several types of reference signals on the DL subframe. One such reference signal is Channel State Information Reference Signal (CSI-RS), which is used by the UE to determine channel-state information (CSI). The network entity provides the CSI-RS configuration to the UE via RRC signaling. The RRC layer in the UE provides the CSI-RS configuration information to the physical layer in the UE (e.g., "higher layer signaling"). The UE reports CSI to the network entity. The CSI-RS is not necessarily transmitted in all subframes.

Referring again to FIG. 6, other reference signals on the DE subframe include a Demodulation Reference Signal (DM-RS) with the REs being referred to as DM-RS REs. Typically, reference signals corresponding to antenna ports 7 and 8 are multiplexed using Code Division Multiplexing (CDM) or other scheme and are mapped to the same REs in time and frequency domain. The subframe can also include other reference signals such as cell-specific reference signal (CRS), positioning reference signal (PRS), primary synchronization signal (PSS) and secondary synchronization signal (SSS) that are distributed in the control regions and/or user data regions of the sub-frame.

As previously noted a UE, in an embodiment of the invention, requests uplink resources from the network by transmitting a scheduling request (SR) to the network entity. Referring to FIG. 6, if the network entity grants the request, it responds by sending a scheduling grant to the UE. A scheduling grant is part of the downlink control information (DCI). The network entity transmits the DCI on the PDCCH. The scheduling grant provides the UE with parameters that the UE uses to transmit data on the PUSCH. These parameters include a data modulation and coding scheme, the transport block size, a resource allocation, hopping parameters, power control information, and other control information. Examples of resources that can be allocated include resource blocks, and bandwidth (transmission bandwidth) within, the transmission bandwidth configuration.

According to an embodiment of the invention, the UEs and cells communicate using carrier aggregation (CA) on the DL and/or UL. In an LTE embodiment, CA allows aggregating multiple component carriers, each with a bandwidth up to 20 MHz, and transmit in parallel to, and/or receive in parallel on multiple component carriers from a single UE. CA increases the site of the channel bandwidth (or aggregated channel bandwidth) usable by the UEs and NEs. Each carrier in a CA scheme is referred to as a component carrier (CC). In an LTE embodiment, up to five component carriers, each having up to a 20 MHz channel bandwidth, can be aggregated together, resulting in an aggregated channel bandwidth of up to 100 MHz.

Figure 7A:
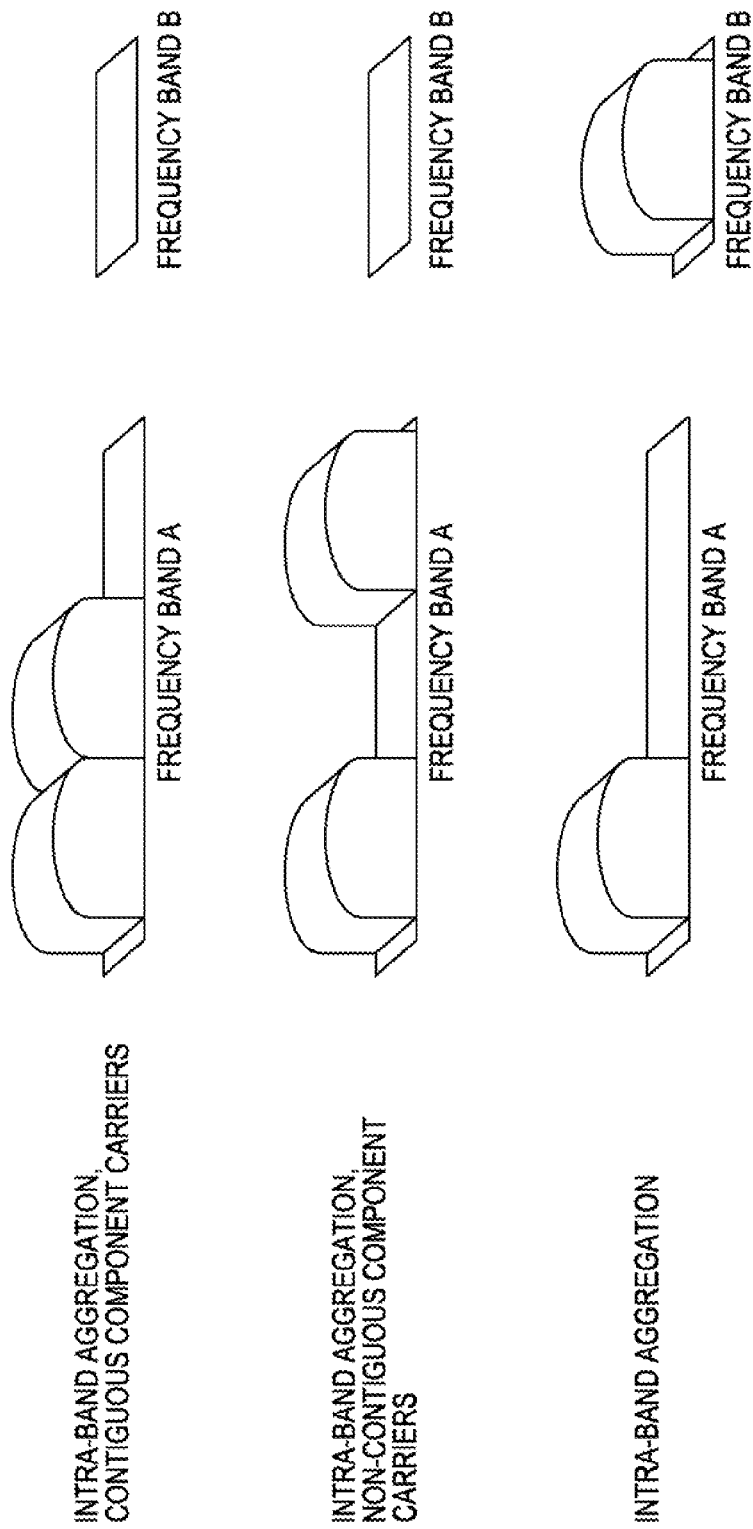
FIGS. 7A and 7B show carrier aggregation according to an embodiment of the invention.
Figure 7B:
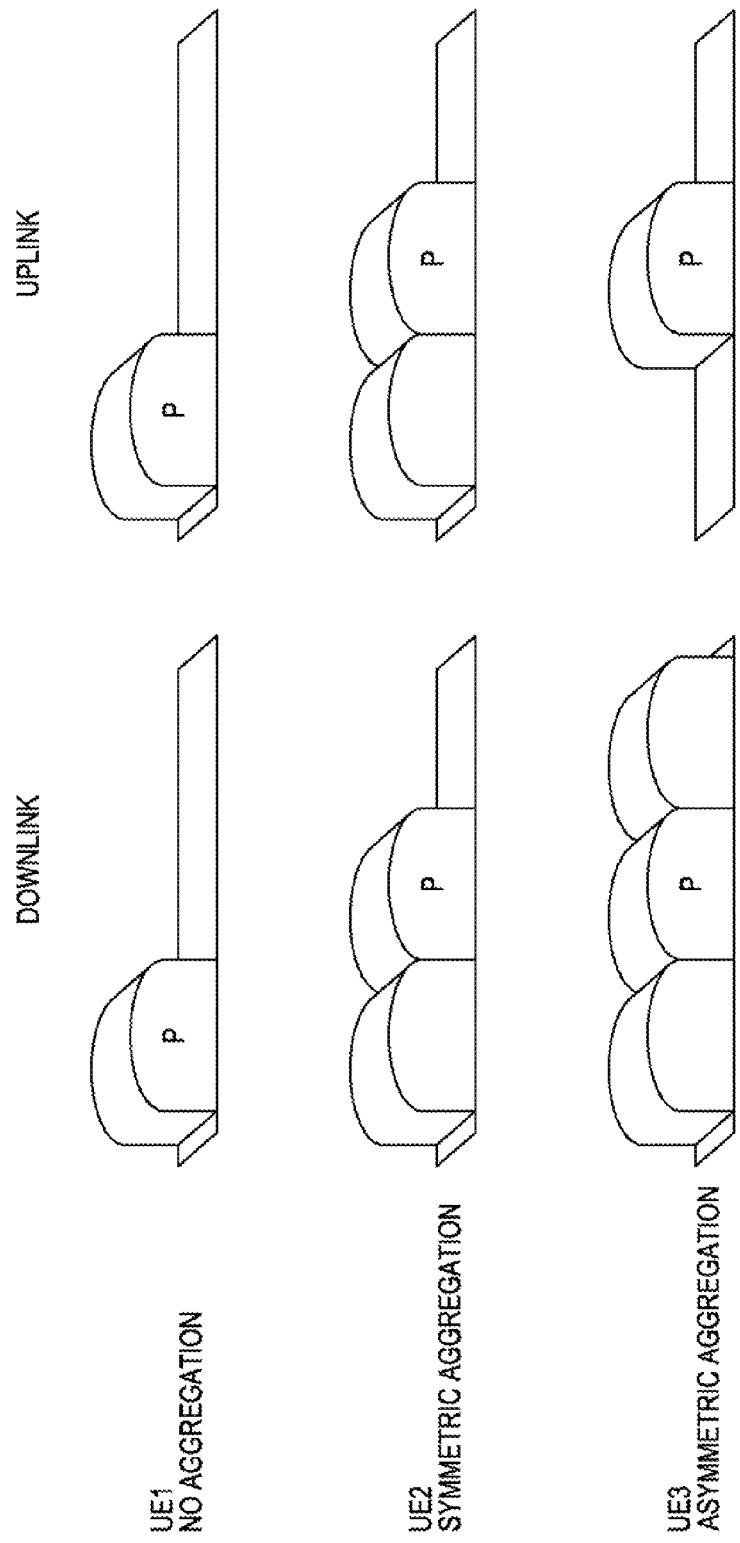

The component carriers in a CA scheme do not need to be contiguous in the frequencies or be within the same frequency band. Referring to FIG. 7A and 7B, three example CA arrangements are depicted: (1) Intra-band aggregation with frequency-contiguous component carriers; (2) Intra-band aggregation with non-contiguous component carriers (3) Inter-band aggregation with non-contiguous component carriers.

According to an embodiment of the invention, a UE communicates in a CA scheme using a downlink primary component. carrier (DL PCC) and a corresponding uplink primary component carrier (UL PCC). The DL PCC and the UL PCC are each provided by a cell referred as Primary Cell (PCell). The PCell provides the NAS mobility and security information. In addition, the UE may have one or more secondary component carriers (SCC) provided by one or more appropriately-configured Secondary Cells (SCells). The UE may communicate over an SCC in either or both of the UL and DL directions.

UEs do not have to use the same carrier as their primary component carrier, nor do they have to aggregate the same number of component carriers. For example, FIG. 7B shows three UEs, each of which uses a different aggregation scheme: UE1 uses no aggregation, UE2 uses symmetric aggregation (two serving cells—PCell and SCell—each with a component carrier in the DL and UL), and UE3 uses asymmetric aggregation (two serving cells, PCell with DL PCC and UL PCC and SCell with only DL SCC). The primary component carrier for each UE is designated with the letter P.

UEs may vary in their ability to use CA. Some may be able to use CA while others may not. Furthermore, a UE may be capable of CA in the downlink direction, but not in the uplink direction (e.g., UE3 in FIG. 7B).

Referring again to FIG. 1, a description of how UE1 communicates with the cells 101k, 101j, and 101c according an embodiment of the invention will now be provided. It is assumed in this description that cell 101k is the PCell, cells 101j and 101c are SCells. It will also be assumed that cell 101j is configured as the "D2D cell," in that it provides UL resources for D2D communication. It is also assumed that UE1 will engage in D2D communication with UE2.

UE1 is initially connected to cell 101k via the DL and UL carriers corresponding to cell 101k. Cell 101k and UE1 exchange messages (e.g., using RRC signaling) to set up CA. These messages may include messages for signaling UE1's CA capabilities to cell 101j, and messages used by cell 101j to provide the CA configuration data to UE1. UE1 uses the CA configuration data to communicate with cells 101k, 101j, and 101c. For UL communication, UE1 transmits to cell 101k, 101j, and 101c using respective first, second and third UL component carriers, each component carrier occupying its own channel bandwidth that is separate from that of the other component carriers. UE1 may also receive from the three cells using multiple DL component carriers, but this disclosure will focus primarily on the UL carriers. UE1 sends both control information and user data to cell 101k on a first UL carrier. UE1 sends user data to cell 101c on the second UL carrier. UE1 may also send user data to cell 101j on the third UL carrier.

To communicate directly with UE2, UE1 requests permission to engage in D2D communication with UE2. The permission request may be sent to a network entity that controls the aggregated cells, to the PCell 101k, or to cell 101j. In response to the request, UE1 and UE2 are allocated time-frequency resources of the second UL carrier on cell 101j. UE1 and UE2 use the second UL carrier to communicate with one another. Using these allocated resources e.g., RBs which can be referred as "D2D RBs") UE1 and UE2 create a data stream, which, for example, is structured as a series of time-multiplexed subframes or slots, in which each subframe or slot uses one or more of the allocated D2D RBs of the second UL carrier.

More specific embodiments of the invention will now be described. In the description, cell k (101k) is the PCell, cell j (101j) is the D2D cell, and cell c (101c) is an SCell that is not a D2D cell. It is to be understood that there may be multiple c cells. Various terms are defined as follows.

| | |
|---|---|
| $P_{CMAX}(i)$ | Total configured maximum output power of a UE on all of the component carriers during subframe i, at which a UE is capable of transmitting. For example, during subframe i, (transmit power of the UE on the component carrier of cell k) + (transmit power of the UE on the component carrier of cell c) + (transmit power of the UE on the component carrier of cell j) is not permitted to exceed $P_{CMAX}(i)$. |
| $P_{CMAX,c}(i)$ | Configured maximum output power on the component carrier of cell c during subframe i at which a UE is capable of transmitting. For example, during subframe i, the transmit power of the UE on the component carrier of cell c is not permitted to exceed $P_{CMAX,c}(i)$. |
| $P_{CMAX,j}(i)$ | Configured maximum output power on the component carrier of cell j during subframe i, at which a UE is capable of transmitting. For example, during subframe i, the transmit power of the UE on the component carrier of cell j is not permitted to exceed $P_{CMAX,j}(i)$. |
| $P_{CMAX,k}(i)$ | Configured maximum output power on the component carrier of cell k during subframe i, at which a UE is capable of transmitting. For example, during subframe i, the transmit power of the UE on the component carrier of cell k is not permitted to exceed $P_{CMAX,k}(i)$. |
| $P_{CMAX,-j}(i)$ | Total configured maximum output power on all of the component carriers except for the component carrier of cell j during subframe i, at which a UE is capable of transmitting. For example, during subframe i, (transmit power of the UE on the component carrier of cell k) + (transmit power of the UE on the component carrier of cell c) is not permitted to exceed $P_{CMAX,-j}(i)$. |
| $P_{D2D,Max}(i)$ | Maximum power at which a UE is permitted to carry out D2D transmission during subframe i regardless of component carrier |
| $P_{D2D,Min}(i)$ | Minimum power at which a UE is permitted to carry out D2D transmission during subframe i, regardless of component carrier |
| $P_{CMAX,D2D}(i)$ | Configured maximum output power at which a UE is capable of carrying out D2D transmission during subframe i |
| $P_{D2D}(i)$ | Power setting of a device-to-device signal transmission from a first UE to at least a second UE during subframe i without power scaling |
| $P_{PUCCH}(i)$ | Power setting of a UEs transmission over the PUCCH (with UCI been included) during subframe i without power scaling |
| $P_{PUSCH,c}(i)$ | Power setting of a UEs transmission over the PUSCH (which does not contain UCI) to cell c during subrame i without power scaling |
| $P_{PUSCH,k}(i)$ | Power setting of a UEs transmission over the PUSCH (which contains UCI) to cell k during subrame i without power scaling |
| $\hat{P}_{PUSCH,a}(i)$, $\hat{P}_{PUSCH,k}(i)$, $\hat{P}_{PUCCH}(i)$, $\hat{P}_{CMAX}(i)$, $\hat{P}_{CMAX,k}(i)$, $\hat{P}_{D2D}(i)$, and $\hat{P}_{CMAX,-j}(i)$ | Linear values in dBm of $P_{PUSCH,a}(i)$, $P_{PUSCH,k}(i)$, $P_{PUCCH}(i)$, $P_{CMAX}(i)$, $P_{CMAX,k}(i)$, $P_{D2D}(i)$, and $P_{CMAX,-j}(i)$, respectively |
| $w_1(i), w_3(i),$ and $w_4(i)$ | Power scaling coefficients for cellular communication |
| $w_2(i)$ | Power scaling coefficient, for D2D communication |
| $\tilde{P}_{PUSCH,c}(i)$, $\tilde{P}_{PUCCH}(i)$, $\tilde{P}_{PUSCH,k}(i)$, $\tilde{P}_{D2D}(i)$, $\tilde{P}_{CMAX,-j}(i)$ | Transmit power levels in linear values resulting from power scaling of $\hat{P}_{PUSCH,c}(i)$, $\hat{P}_{PUCCH}(i)$, $\hat{P}_{PUSCH,k}(i)$, $\hat{P}_{D2D}(i)$, and $\hat{P}_{CMAX,-j}(i)$, respectively |

As previously discussed, a UE that uses CA configures its transmit power so that it does not exceed $P_{CMAX}(i)$ and $P_{CMAX,c}(i)$.

With respect to various embodiments of the invention, techniques for configuring transmit power for each component carrier in a CA scheme, including a component carrier being used for D2D communication, will now be described. The description will often refer to the UEs, NEs, and cells of FIG. 1. However, it is to be understood that the embodiments described are applicable to any suitable network.

In an embodiment of the invention, UE1 is capable of UL CA (e.g. inter-band CA or intra-band non-contiguous CA) and carries out cellular uplink transmission and D2D transmission simultaneously on different UL carriers. $P_{CMAX,D2D}(i)$ for UE1 on an UL carrier in this scenario can be different from $P_{CMAX}(i)$ for UE1 on the UL carrier.

Referring to FIG. 1, UL carrier resources on cell 101j are allocated to UE1 for D2D transmission in such a way that, if those resources (or a portion thereof) are also to be used by UE3 for cellular transmission, the degree to which the D2D transmission interferes with UE's cellular transmission (as measured at NEj) is limited.

Assume, for example, that UE3 is using the same PUSCH RBs for cellular communication that UE1 is using for D2D communication. When NEj schedules the D2D resources for use by UE1, NEj determines what level of interference is permitted to be experienced at NEj. The allowed interference level may be determined based on metrics such as a target signal-to-interference and noise ratio (SINR) at NEj, and the received power of the cellular communication from UE3. NEj signals the allowed interference level to UE1. The signal may not necessarily, be the actual value of the allowed interference level, but may rather be a representation of that value, such as an entry point of a look-up table (e.g., −100 dBm maps to 0, −110 dBm maps to 1, etc.). Using the allowed interference level, UE1 determines $P_{D2D,Max}(i)$, possibly taking into account the pathloss between NEj and UE1.

Alternatively, NEj may determine $P_{D2D,Max}(i)$ and signal $P_{D2D,Max}(i)$ (or a representation thereof) to UE1. $P_{D2D,Max}(i)$ may be different for each UE that is part of D2D communication (e.g., each UE of a D2D pair). For example, UE1 and UE2 may engage in D2D communication with one another, but have different allowed maximum transmit powers.

According to an embodiment of the invention, $P_{D2D,Min}(i)$ for UE1 can be determined based on a target SINR at the other side of the D2D communication—at UE2, for example. This target SINR is affected by, for example, the pathloss between the D2D UE pair (UE1 and UE2), and the inter-cell and intra-cell interference level observed at the other side of the D2D communication (at UE2).

In an embodiment of the invention, $P_{D2D,Max}(i)$ for UE1 is less than $P_{CMAX,j}(i)$.

In accordance with an embodiment of the invention, UE1 determines the setting of the $P_{D2D}(i)$ (over the PUSCH) based on factors such as the number of allocated D2D RBs, a base received power level, the pathloss between the D2D UE pair (UE1 and UE2), the D2D link spectral efficiency (e.g., the number of bits per data subcarrier or resource element (RE), the Modulation and Coding Scheme (MCS) of the D2D transmission), Transmit Power control (TPC) commands etc. In an embodiment, $P_{D2D,Min}(i) \le P_{D2D}(i) \le P_{D2D,Max}(i) \le P_{CMAX,j}$. In an embodiment of the invention, $P_{D2D}(i)$ is not constrained by a $P_{D2D,Min}(i)$.

In an embodiment, $P_{D2D}(i)$ is upper bounded $P_{CMAX,D2D}(i)$. Thus, $P_{D2D}(i) \le P_{CMAX,D2D}(i)$. In one embodiment, the UE sets $P_{CMAX,D2D}(i)$ at $P_{CMAX,j}(i)$, thus) $P_{CMAX,D2D}(i) = P_{CMAX,j}(i)$.

In another embodiment, the UE sets $P_{CMAX,D2D}(i)$ at $P_{D2D,Max}(i)$, thus $P_{CMAX,D2D}(i) = P_{D2D,Max}(i)$.

In yet another embodiment, the UE sets $P_{CMAX,D2D}(i)$ at $\min(P_{D2D,Max}(i), P_{CMAX,j}(i))$. Thus $P_{CMAX,D2D}(i) = \min(P_{D2D,Max}(i), P_{CMAX,j}(i))$.

In an embodiment, when UEs simultaneously carry out D2D transmission on the D2D cell (cell 101*j*), and cellular uplink transmissions on one or more of the other serving cells (cell 101*k* and cell 101*c*), the total overall transmit power of the UE (e.g., the actual D2D transmit power of the UE on the component carrier of serving cell j+the actual transmit power of the UE to serving cell k+the actual transmit power of the UE to serving cell c) is bounded by $P_{CMAX}(i)$.

In an embodiment, the total cellular transmit power (e.g., the actual transmit power of the UE to serving cell k+the actual transmit power of the UE to serving cell c) is bounded by $P_{CMAX,-j}(i)$.

According to one LTE embodiment, and $P_{CMAX,k}(i)$ and $P_{CMAX}(i)$ for a set of serving cells are determined by the UE according to Section 6.2.5A in TS 36.101 v11.3.0.

In an embodiment, $P_{CMAX,k}(i)$, $P_{CMAX,-j}(i)$, and $P_{CMAX}(i)$ satisfy the following inequality (e.g. inter-band CA or intra-band non-contiguous CA):

$$P_{CMAX,k}(i) \le P_{CMAX,-j}(i) \le P_{CMAX}(i)$$

In an embodiment, for power-limited UEs (e.g., a UE whose total transmit power would exceed $P_{CMAX}(i)$), power scaling to the transmission(s) on one or more serving cells may be applied to keep the total transmit power of the UE and the total cellular transmit power of the UE equal to or less than $P_{CMAX}(i)$ and $P_{CMAX,-j}(i)$, respectively. Accordingly, $$\sum_{c \ne j, c \ne k} w_1(i) \cdot \hat{P}_{PUSCH,c}(i) + w_2(i) \cdot \hat{P}_{D2D}(i) + \\ w_3(i) \cdot \hat{P}_{PUSCH,k}(i) + w_4(i) \cdot \hat{P}_{PUCCH}(i) \le \hat{P}_{CMAX}(i) \quad (1)$$

$$\sum_{c \ne j, c \ne k} w_1(i) \cdot \hat{P}_{PUSCH,c}(i) + w_3(i) \cdot \hat{P}_{PUSCH,k}(i) + w_4(i) \cdot \hat{P}_{PUCCH}(i) \le \\ \hat{P}_{CMAX,-j}(i), \quad (2)$$

where $0 \le w_1(i), w_2(i), w_3(i), w_4(i) \le 1$ are power scaling coefficients or factors, and PUSCH on the serving cell k (e.g., primary serving cell (cell 101*k*)) includes uplink control information (UCI). Note that $w_1(i)$ values are the same across serving cells, c (c≠j, c≠k) when $w_1(i)>0$ but for certain serving cells $w_1(i)$ may be zero. In an LTE embodiment, $P_{PUSCH,c}(i)$, $P_{PUSCH,k}(i)$, and $P_{PUCCH}(i)$ are determined according to Section 5.1 in TS 36.213 v11.1.10.

According to various embodiments, the power scaling coefficients for cellular communication, $w_1(i)$, $w_3(i)$, $w_4(i)$, and the power scaling coefficient for D2D communication, $w_2(i)$, are different.

In one embodiment, allocating the transmit power of a UE on the various component carriers occurs according to the following priority order (1) $\hat{P}_{PUCCH}(i)$, (2) $\hat{P}_{PUSCH,k}(i)$ and (3) $\hat{P}_{D2D}(i)$. The reason for $\hat{P}_{PUCCH}(i)$ and $\hat{P}_{PUSCH,k}(i)$ to have a higher priority than $\hat{P}_{D2D}(i)$ is that the UCI contained in the PUCCH and the PUSCH (of cell k) may include both cellular and D2D related control information. In this embodiment, power scaling is applied only to $\hat{P}_{PUSCH,c}(i)$ and to $\hat{P}_{D2D}(i)$. This is accomplished by setting $w_3(i) = w_4(i) = 1$. However, if $\hat{P}_{PUSCH}(i)$, or $\hat{P}_{PUSCH,k}(i) + \hat{P}_{PUCCH}(i)$ would exceed $\hat{P}_{CMAX,-j}(i)$ (e.g., for intra-band contiguous CA), the power scaling that is applied to $\hat{P}_{PUSCH,k}(i)$ would be where $w_3(i)$, where $0 \le w_3(i) \le 1$.

If the UE does not have a PUSCH transmission that includes UCI, $\hat{P}_{PUSCH,k}(i) = 0$. If the UE does not support simultaneous PUCCH and PUSCH transmission, the UCI is transmitted on the PUSCH and $\hat{P}_{PUCCH}(i) = 0$ and $\hat{P}_{PUSCH,k}(i) = \min(\hat{P}_{PUSCH,k}(i), \hat{P}_{CMAX,-j}(i), \hat{P}_{CMAX}(i))$. If the UE has simultaneous PUCCH and PUSCH with UCI transmission, both the PUCCH and the PUSCH with UCI are transmitted on the same serving cell k (cell 101*k*) and $$\hat{P}_{PUSCH,k}(i) = \min(\hat{P}_{PUSCH,k}(i), (\hat{P}_{CMAX,-j}(i) - \hat{P}_{PUCCH}(i), \\ (\hat{P}_{CMAX}(i) - \hat{P}_{PUCCH}(i))).$$

Different scenarios for configuring UL transmit power will now be described.

Scenario 1: D2D has the Lowest Priority

In this scenario, the D2D transmission has the lowest priority. That is, if the UE is power limited (i.e., total transmit power of the UE would exceed $\hat{P}_{CMAX}(i)$, priority order for transmit power allocation is (1) $\hat{P}_{PUCCH}(i)$, (2) $\hat{P}_{PUSCH,k}(i)$, (3) $\hat{P}_{PUSCH,c}(i)$, followed by (4) $\hat{P}_{D2D}(i)$.

In an embodiment, $\tilde{P}_{PUSCH,c}(i)$ and $\tilde{P}_{D2D}(i)$ can be determined such that they satisfy the inequalities of equations (1) and (2), by applying the scaling coefficients $w_1(i)$ and $w_2(i)$ to $\hat{P}_{PUSCH,c}(i)$ and $\hat{P}_{D2D}(i)$ as follows:

$$\sum_{c \neq j, c \neq k} \tilde{P}_{PUSCH,c}(i) =$$

$$\sum_{c \neq j, c \neq k} w_1(i) \cdot \hat{P}_{PUSCH,c}(i) \leq \min\left(\sum_{c \neq j, c \neq k} \hat{P}_{PUSCH,c}(i), \hat{P}_{CMAX,-j}(i) - \hat{P}_{PUCCH}(i) - \hat{P}_{PUSCH,k}(i)\right)$$

$$\tilde{P}_{D2D}(i) = w_2(i) \cdot \hat{P}_{D2D}(i)$$

$$= \min\left(\hat{P}_{D2D}(i), \hat{P}_{CMAX}(i) - \sum_{c \neq j, c \neq k} \tilde{P}_{PUSCH,c}(i) - \tilde{P}_{PUCCH}(i) - \tilde{P}_{PUSCH,k}(i)\right)$$

When $\hat{P}_{CMAX,-j}(i) = \hat{P}_{CMAX}(i)$, the D2D transmission is dropped $$(w_2(i) = 0), \text{ if } \sum_{c \neq j, c \neq k} \hat{P}_{PUSCH,c}(i) \geq \hat{P}_{CMAX}(i) - \tilde{P}_{PUCCH}(i) - \tilde{P}_{PUSCH,k}(i).$$

Note that $w_2(i)$ may be set to zero and the D2D transmission dropped if $\tilde{P}_{D2D}(i)$ is small (e.g., smaller than a threshold, smaller than $P_{D2D,Min}(i)$).

Scenario 2: D2D has the Highest Priority with a Certain Guaranteed Power

In this scenario, D2D transmission has the highest priority, and there is a certain guaranteed power for $P_{D2D}(i)$. The UE may be configured to transmit the D2D transmission up to a certain maximum power ($P_{D2D,Limit}(i)$), when power limited (i.e., total transmit power of UE would exceed $\hat{P}_{CMAX}(i)$). In one embodiment, the UE is signaled the power-limited maximum D2D output power, $P_{D2D,Limit}$. In another embodiment, the UE determines $P_{D2D,Limit}$ applying a D2D maximum power reduction (D-MPR) to $P_{CMAX,D2D}(i)$, thus $P_{D2D,Limit}(i) = P_{CMAX,D2D}(i) - D-MPR$. The D2D maximum power reduction (D-MPR) may be signaled to the UE or determined by the UE based on some predefined rules, such as based on one or more of the number of D2D RBs, the modulation scheme for D2D transmission, the position of the D2D RBs, the channel bandwidth etc. Thus, in this case, the priority order for transmit power allocation when power limited is (1) $\hat{P}_{D2D}(i)$ up to $\hat{P}_{D2D,Limit}$ (linear value of $P_{D2D,Limit}$), (2) $\hat{P}_{PUCCH}(i)$, (3) $\hat{P}_{PUSCH,k}(i)$, followed by (4) $\hat{P}_{PUSCH,c}(i)$. $\tilde{P}_{D2D}(i)$ and $\hat{P}_{CMAX,-j}(i)$ can be determined as, $$\tilde{P}_{D2D}(i) = \min(\hat{P}_{D2D}(i), \hat{P}_{D2D,Limit}(i))$$

$$\tilde{P}_{CMAX,-j}(i) = \min(\hat{P}_{CMAX,-j}(i), (\hat{P}_{CMAX}(i) - \tilde{P}_{D2D}(i)))$$

Subsequently, $\tilde{P}_{PUCCH}(i)$ and $\hat{P}_{PUSCH,k}(i)$ on serving cell 101k, and $\tilde{P}_{PUSCH,c}(i)$ on serving cell 101c can be determined according to, $$\tilde{P}_{PUCCH}(i) = \min(\hat{P}_{PUCCH}(i), \tilde{P}_{CMAX,-j}(i))$$

$$\tilde{P}_{PUSCH,k}(i) = \min(\hat{P}_{PUSCH,k}(i), (\tilde{P}_{CMAX,-j}(i) - \tilde{P}_{PUCCH}(i)))$$

$$\sum_{c \neq j, c \neq k} \tilde{P}_{PUSCH,c}(i) = \sum_{c \neq j, c \neq k} w_1(i) \cdot \hat{P}_{PUSCH,c}(i) \leq$$

$$\min\left(\sum_{c \neq j, c \neq k} \hat{P}_{PUSCH,c}(i), \tilde{P}_{CMAX,-j}(i) - \tilde{P}_{PUCCH}(i) - \tilde{P}_{PUSCH,k}(i)\right)$$

If $w_1(i) = 0$ any remaining power may be used for D2D transmission, allowing for $\hat{P}_{D2D}(i)$ to be greater than $\hat{P}_{D2D,Limit}$, if needed, according to:

$$\tilde{P}_{CMAX,-j}(i) = \min(\hat{P}_{CMAX,-j}(i), (\hat{P}_{CMAX}(i) - \tilde{P}_{D2D,Limit}(i)))$$

$$\tilde{P}_{PUCCH}(i) = \min(\hat{P}_{PUCCH}(i), \tilde{P}_{CMAX,-j}(i))$$

$$\tilde{P}_{PUSCH,k}(i) = \min(\hat{P}_{PUSCH,k}(i), (\tilde{P}_{CMAX,-j}(i) - \tilde{P}_{PUCCH}(i)))$$

$$\tilde{P}_{D2D}(i) = \min(\hat{P}_{D2D}(i), \hat{P}_{CMAX}(i) - \tilde{P}_{PUCCH}(i) - \tilde{P}_{PUSCH}(i)).$$

Scenario 3: D2D has the Second Highest Priority Following PUCCH

In another alternative, when the UE is power-limited, the priority order for power allocation may be (1) $\hat{P}_{PUCCH}(i)$, (2) $\hat{P}_{D2D}(i)$, (3) $\hat{P}_{PUSCH,k}(i)$ followed by (4) $\hat{P}_{PUSCH,c}(i)$. In this case, $\tilde{P}_{D2D}(i)$ is determined according to $$\tilde{P}_{D2D}(i) = \min(\hat{P}_{D2D}(i), \hat{P}_{CMAX}(i) - \tilde{P}_{PUCCH}(i))$$

with $w_4(i) = 1$. Subsequently, $\tilde{P}_{PUSCH,k}(i)$ and $\tilde{P}_{PUSCH,c}(i)$, are determined as $$\tilde{P}_{PUSCH,k}(i) =$$
$$\min\left(\hat{P}_{PUSCH,k}(i), \min(\hat{P}_{CMAX,-j}(i), \hat{P}_{CMAX}(i) - \tilde{P}_{D2D}(i)) - \tilde{P}_{PUCCH}(i)\right)$$

$$\sum_{c \neq j, c \neq k} \tilde{P}_{PUSCH,c}(i) = \sum_{c \neq j, c \neq k} w_1(i) \cdot \hat{P}_{PUSCH,c}(i) \leq \min\left(\sum_{c \neq j, c \neq k} \hat{P}_{PUSCH,c}(i),\right.$$
$$\left.\min(\hat{P}_{CMAX,-j}(i), \hat{P}_{CMAX}(i) - \tilde{P}_{D2D}(i)) - \tilde{P}_{PUCCH}(i) - \tilde{P}_{PUSCH,k}(i)\right)$$

Scenario 4: D2D has the Third Highest Priority Following PUCCH and PUSCH with UCI In another alternative, when the UE is power-limited, the priority order for power allocation may be (1) $\hat{P}_{PUCCH}(i)$, (2) $\hat{P}_{PUSCH,k}(i)$, (3) $\hat{P}_{D2D}(i)$, followed by (4) $\hat{P}_{PUSCH,c}(i)$. In this case, $\tilde{P}_{D2D}(i)$ can be determined as according to $$\tilde{P}_{D2D}(i) = \min(\hat{P}_{D2D}(i), \hat{P}_{CMAX}(i) - \tilde{P}_{PUCCH}(i) - \tilde{P}_{PUSCH,k}(i)),$$

with $\tilde{P}_{PUSCH,k}(i)$ being determined according to $$\tilde{P}_{PUSCH,k}(i) = \min(\hat{P}_{PUSCH,k}(i), (\hat{P}_{CMAX,-j}(i) - \tilde{P}_{PUCCH}(i))).$$

$\tilde{P}_{PUSCH,c}(i)$ for one or more cells c is determined according to $$\sum_{c \neq j, c \neq k} \tilde{P}_{PUSCH,c}(i) = \sum_{c \neq j, c \neq k} w_1(i) \cdot \hat{P}_{PUSCH,c}(i) \leq \min\left(\sum_{c \neq j, c \neq k} \hat{P}_{PUSCH,c}(i),\right.$$
$$\left.\min(\hat{P}_{CMAX}(i) - \tilde{P}_{D2D}(i), \hat{P}_{CMAX,-j}(i)) - \tilde{P}_{PUCCH}(i) - \tilde{P}_{PUSCH,k}(i)\right).$$

Scenario 5: Dynamic Adjustment of Power Allocation between D2D and PUSCH without UCI, with Prioritizing PUCCH and PUSCH with UCI In another alternative, for the power-limited UE, power allocation between $\hat{P}_{D2D}(i)$ and $\hat{P}_{PUSCH,c}(i)$ can be dynamically adjusted based on service priority and Quality of Service (QoS) classes of cellular and D2D communications, while the transmit power of the cellular control signal, that is, $\hat{P}_{PUCCH}(i)$ and $\hat{P}_{PUSCH,c}(i)$, is maintained, prioritized and determined as discussed above for the priority order of (1) $\hat{P}_{PUCCH}(i)$ and (2) $\hat{P}_{PUSCH,k}(i)$. A D2D UE may reduce $\hat{P}_{CMAX,-j}(i)$ and allow additional power for $\hat{P}_{D2D}(i)$ by using an additional power scaling coefficient $\alpha$ as follows:

$$\sum_{c \neq j, c \neq k} \tilde{P}_{PUSCH,c}(i) == \sum_{c \neq j, c \neq k} w_1(i) \cdot \hat{P}_{PUSCH,c}(i) \leq$$

$$\min\left(\sum_{c \neq j, c \neq k} \hat{P}_{PUSCH,c}(i), \alpha \cdot \hat{P}_{CMAX,-j}(i) - \hat{P}_{PUCCH}(i) - \hat{P}_{PUSCH,k}(i)\right)$$

$$\tilde{P}_{D2D}(i) = \min\Big(\hat{P}_{D2D}(i),$$

$$\hat{P}_{CMAX}(i) - \sum_{c \neq j, c \neq k} \tilde{P}_{PUSCH,c}(i) - \hat{P}_{PUCCH}(i) - \hat{P}_{PUSCH,k}(i)\Big),$$

where $$\frac{(\hat{P}_{PUCCH}(i) + \hat{P}_{PUSCH,k}(i))}{\hat{P}_{CMAX,-j}(i)} \leq \alpha \leq 1.$$

If $\alpha=1$, the above equations are equivalent to the scenario 1, where $\hat{P}_{D2D}(i)$ has the lowest priority. If $$\alpha = \frac{(\hat{P}_{PUCCH}(i) + \hat{P}_{PUSCH,k}(i))}{\hat{P}_{CMAX,-j}(i)},$$

no power is allocated for $P_{PUSCH,c}(i)$ by setting $w_1(i)=0$.

In another embodiment of the invention, when the UE is configured with cell j and cell k (cell 101*j* and cell 101*k*), $\hat{P}_{PUSCH,k}(i)$, $\hat{P}_{PUCCH}(i)$, and $\hat{P}_{D2D}(i)$ should satisfy the following inequality:

$$w_2(i) \cdot \hat{P}_{D2D}(i) + w_3(i) \cdot \hat{P}_{PUSCH,k}(i) + w_4(i) \cdot \hat{P}_{PUCCH}(i) \leq \hat{P}_{CMAX}(i), \quad (3)$$

where $0 \leq w_2(i), w_3(i), w_4(i) \leq 1$. In this scenario, $\hat{P}_{CMAX,-j}(i) = \hat{P}_{CMAX,k}(i)$. In addition,) and $\hat{P}_{PUCCH}(i)$ and $\hat{P}_{PUSCH,k}(i)$ are determined according to Section 5.1 in TS 36.213 v11.0.0, and satisfy $\hat{P}_{PUSCH,k}(i) + \hat{P}_{PUCCH}(i) \leq P_{CMAX,k}(i)$. If the UE does not have PUSCH transmission that includes UCI, $\hat{P}_{PUSCH,k}(i)=0$. If the UE does not support simultaneous PUCCH and PUSCH transmission, UCI is transmitted on PUSCH and $\hat{P}_{PUCCH}(i)=0$. If the UE has simultaneous PUCCH and PUSCH transmission with UCI, both PUCCH and PUSCH with UCI are on the same serving cell k (cell 101*k*).

In those scenarios in which $\hat{P}_{D2D}(i)$ has the lowest priority and the UE is power-limited and configured with the two cells j and k, $\tilde{P}_{D2D}(i)$ can be determined as, $$\tilde{P}_{D2D}(i) = w_2(i) \cdot \hat{P}_{D2D}(i) = \min(\hat{P}_{D2D}(i), \hat{P}_{CMAX}(i) - \hat{P}_{PUCCH}(i) - \hat{P}_{PUSCH,k}(i))$$

with $w_3(i) = w_4(i) = 1$.

In the scenarios in which $\hat{P}_{D2D}(i)$ has the highest priority with a guaranteed power up to $\hat{P}_{D2D,Limit}$ and the UE is power-limited and configured with the two cells, $\tilde{P}_{PUCCH}(i)$ and $\tilde{P}_{D2D}(i)$ are determined as, $$\tilde{P}_{PUCCH}(i) = \min(\hat{P}_{PUCCH}(i), \hat{P}_{CMAX}(i) - \hat{P}_{D2D,Limit}(i))$$

$$\tilde{P}_{PUSCH,k}(i) = \min(\hat{P}_{PUSCH,k}(i), (\hat{P}_{CMAX}(i) - \hat{P}_{D2D,Limit}(i) - \tilde{P}_{PUCCH}(i)))$$

$$\tilde{P}_{D2D}(i) = \min(\hat{P}_{D2D}(i), \hat{P}_{CMAX}(i) - \tilde{P}_{PUCCH}(i) - \tilde{P}_{PUSCH,k}(i))$$

In the scenario that the D2D has the second highest priority following PUCCH and the UE is power-limited and configured with the two cells, the adjusted D2D transmit power is given by $$\tilde{P}_{D2D}(i) = \min(\hat{P}_{D2D}(i), \hat{P}_{CMAX}(i) - \hat{P}_{PUCCH}(i))$$

with $w_4(i)=1$. The adjusted transmit powers of PUSCH with UCI, $\tilde{P}_{PUSCH,k}(i)$, is determined as, $$\tilde{P}_{PUSCH,k}(i) = \min(\hat{P}_{PUSCH,k}(i), \hat{P}_{CMAX}(i) - \tilde{P}_{D2D}(i) - \hat{P}_{PUCCH}(i))$$

In another alternative, for the power-limited UE and configured with the two cells, power allocation between, $\hat{P}_{D2D}(i)$ and $\hat{P}_{PUSCH,k}(i)$ can be dynamically adjusted by using an additional power scaling coefficient or factor $\alpha$ as follows:

$$\tilde{P}_{PUSCH,k}(i) = \min\left(\hat{P}_{PUSCH,k}(i), \alpha \cdot \hat{P}_{CMAX,k}(i) - \hat{P}_{PUCCH}(i)\right)$$

$$\tilde{P}_{D2D}(i) = \min\left(\hat{P}_{D2D}(i), \hat{P}_{CMAX}(i) - \hat{P}_{PUCCH}(i) - \tilde{P}_{PUSCH,k}(i)\right),$$

where $$\frac{\hat{P}_{PUCCH}(i)}{\hat{P}_{CMAX,k}(i)} \leq \alpha \leq 1.$$

If $\alpha=1$, then $\tilde{P}_{PUSCH,k}(i) = \hat{P}_{PUSCH,k}(i)$ and accordingly, $\hat{P}_{D2D}(i)$ has lowest priority. If $$\alpha = \frac{\hat{P}_{PUCCH}(i)}{\hat{P}_{CMAX,k}(i)},$$

no power is allocated for transmission of PUSCH with UCI when the UE has simultaneous PUCCH and PUSCH transmission with UCI on serving cell k.

Figure 8:
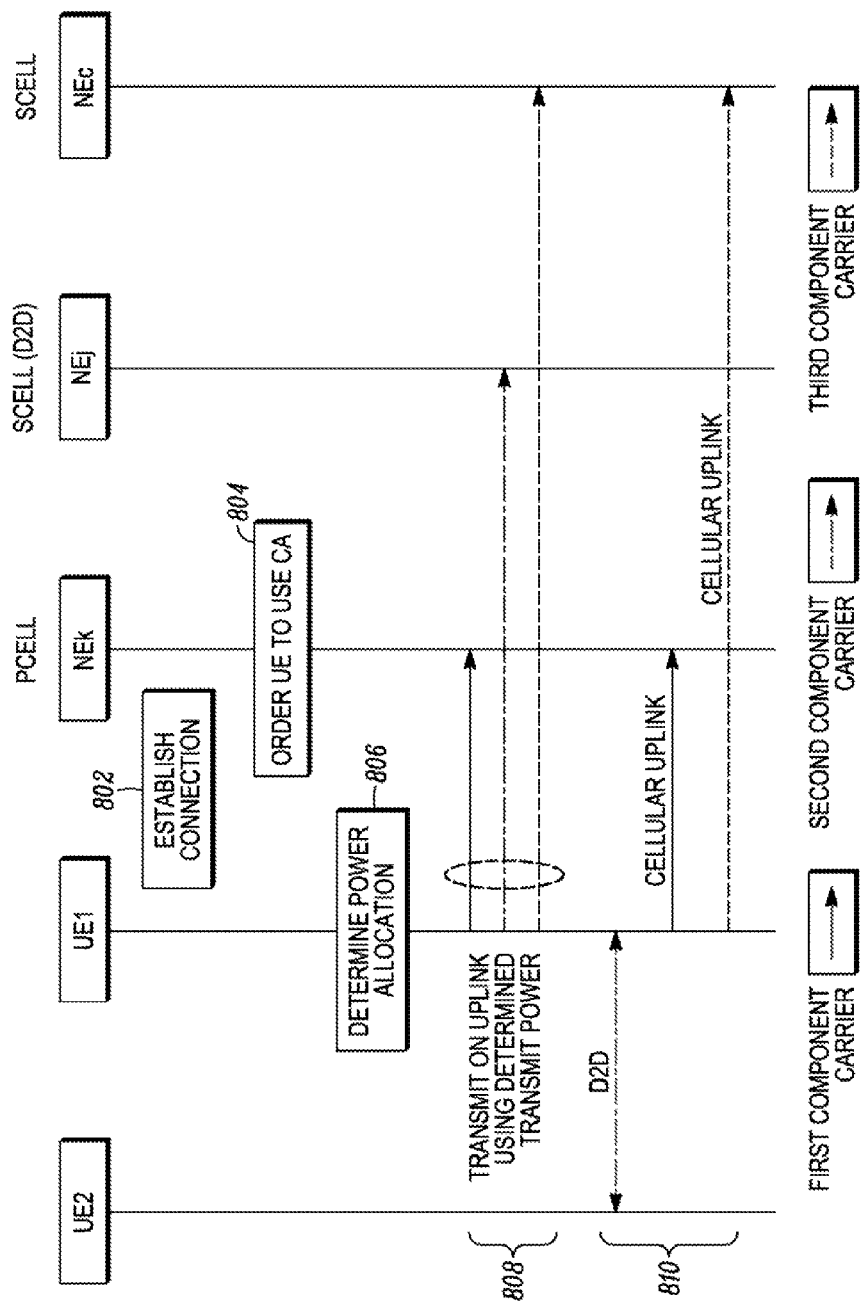
FIG. 8 shows an example of communication using various embodiments of the invention.

Referring to FIG. 8 and FIG. 1, a procedure in which a UE allocates power and engages in D2D communication in parallel with network communication according to an embodiment of the invention will now be described.

At step 802, UE1 establishes a connection with NEk. NEk configures UE1 for CA by giving UE1 the CA configuration, such as which cells are to function as SCells (NEj and NEc in this case) and where in the frequency spectrum the component carriers are located. At step 804, NEk orders UE1 to use CA (i.e., activate CA). At step 806, UE1 determines how transmit power is to be allocated among the different component carriers for cellular communication as well as for D2D communication. UE1 makes this determination by carrying out one or more of the procedures set forth in this disclosure.

At step 808, UE1 transmits to NEc, NEj, and NEk using the power allocations that UE1 determined in step 806. In this example, UE1 transmits control information and user data to NEk on a first component carrier. Also at step 808, UE1 transmits user data to NEj on a second component carrier, and transmits user data to NEC on a third component carrier.

At step 810, UE1 engages in D2D communication with UE2 using the resources of the second component carrier. The determination as to which resources the UEs are to use for D2D communication may be made by NEj and communicated to UE1 by NEj. UE1 also engages in cellular communication via NEk and NEc over the first and third component carriers.

It can be seen from the foregoing that a method and apparatus for device-to-device communication has been provided. The terms, descriptions and figures used herein are set forth by way of illustration only and are not meant as limitations.

For example, in the present disclosure, when two or more components are "electrically coupled," they are linked such that electrical signals from one component will reach the other component, even though there may be intermediate components through which such signals may pass.

For example, interactions between UEs and NEs are often described as occurring in a particular order. However, any suitable communication sequence may be used.

LIST OF ACRONYMS

CA Carrier Aggregation
CoMP Coordinated Multi-Point
CP Cyclic Prefix
CQI Channel Quality Indicator
CRS Common Reference Signal
CSI Channel State Information
CSI-RS Channel State information Reference Signal
D2D Device to Device
DCI Downlink Control Information
DL Downlink
DM-RS Demodulation Reference Signal
DFT-SOFDM Discrete Fourier Transform Spread OFDM
eNB Evolved Node B
EPDCCH Enhanced Physical Downlink Control Channel
E-UTRA Evolved UTRA
FDD Frequency Division Duplex
HARQ Hybrid Automatic Repeat Request
LTE Long-Term Evolution
MAC Media Access Control
MCS Modulation and Coding Scheme
MIMO Multiple-Input Multiple-Output
OFDMA Orthogonal Frequency Division Multiple Access
PDCCH Physical Downlink Control Channel
PDSCH Physical Downlink Shared Channel
PHICH Physical Hybrid ARQ Channel
PMI Precoding Matrix Indicators
PRB Physical Resource Block
PRS Positioning Reference Signal
PSS Primary Synchronization Signal
PTI Precoder Type Indication
PUCCH Physical Uplink Control Channel
PUSCH Physical Uplink Shared Channel
QAM Quadrature Amplitude Modulation
QPSK Quadrature Phase Shift-Keying
RAT Radio Access Technology
RB Resource Block
RE Resource Element
REG Resource Element Group
RF Radio Frequency
RI Rank Indicator
RNC Radio Network Controller
RNTI Radio Network Temporary identifier
RRC Radio Resource Control
RRH Remote Radio Head
RS Reference Symbol
RSRP Reference Signal Received Power
RSRQ Reference Signal Received Quality
RSSI Received Signal Strength Indicator
SC-FDMA Single-Carrier Frequency Division Multiple Access
SFN System Frame Number
SIB System Information Block
SI-RNTI System information RNTI
SPS Semi-Persistent Scheduling
SR Scheduling Request
S-RNTI Serving RNC RNTI
SRS Sounding Reference Signal
SSS Secondary Synchronization Signal
TDD Time Division Duplex
TM Transmission Mode
TP Transmission Point
TTI Transmission Time Interval
UCI Uplink Control Information
UE User Equipment
UERS UE-specific Reference Symbol
UL Uplink
UL-SCH Uplink Shared Channel
UMTS Universal Mobile Telecommunications System

The invention claimed is:

1. A method, on a first UE, for managing transmit power in device-to-device communication and cellular communication, the method comprising:
  determining a first configured maximum output power, wherein the first configured maximum output power is based on a configuration of a first cell;
  determining a second configured maximum output power, wherein the second configured maximum output power is based on the configuration of the first cell and a configuration of a second cell;
  determining whether a total transmit power would exceed the second configured maximum output power; and
  if it is determined that the total transmit power would exceed the second configured maximum output power, performing steps comprising:
    determining a cellular transmit power based on one or more of a plurality of factors, the plurality comprising: the first configured maximum output power, the second configured maximum output power, and the relative priority of service of device-to-device communication and cellular communication;
    transmitting a cellular signal on a carrier of the first cell at the determined cellular transmit power;
    determining a device-to-device transmit power based on one or more of a plurality of factors, the plurality comprising: the first configured maximum output power, the second configured maximum output power, and the relative priority of service of device-to-device communication and cellular communication; and
    transmitting a device-to-device signal to a second UE on a carrier of the second cell at the determined device-to-device transmit power; wherein:

$$w_2(i)\cdot\hat{P}_{D2D}(i)+w_3(i)\cdot\hat{P}_{PUSCH,k}(i)+w_4(i)\cdot\hat{P}_{PUCCH}(i) \leq \hat{P}_{CMAX}(i);$$

$\hat{P}_{D2D}(i)$ is the linear value of power setting of device-to-device signal transmission from the first UE to the second UE without power scaling;
$\hat{P}_{PUSCH,k}(i)$ is the linear value of power setting of cellular uplink data channel signal transmission from the first UE to a primary cell k without power scaling;
$\hat{P}_{PUCCH}(i)$ is the linear value of power setting of cellular uplink control channel signal transmission from the first UE without power scaling;

$\hat{P}_{CMAX,k}(i)$ is the linear value of the first configured maximum output power level;

$\hat{P}_{CMAX}(i)$ is the linear value of the second configured maximum output power level;

$\hat{P}_{PUSCH,k}(i) + \hat{P}_{PUCCH}(i) \le \hat{P}CMAX, k(i);$ $w_2(i)$, $w_3(i)$ and $w_4(i)$ are power scaling factors; and the determined device-to-device transmit power and the determined cellular transmit power are:

$\tilde{P}_{D2D}(i) = w_2(i) \cdot \hat{P}_{D2D}(i),$ $\tilde{P}_{PUSCH,k}(i) = w_3(i) \cdot \hat{P}_{PUSCH,k}(i),$ $\tilde{P}_{PUCCH}(i) = w_4(i) \cdot \hat{P}_{PUCCH}(i),$ and $0 \le w_2(i), w_3(i), w_4(i) \le 1.$ 2. A method for transmitting over a plurality of uplink carriers, the method comprising:

receiving an indication, from a network entity, to perform device-to-device communication on a first uplink carrier of the plurality of uplink carriers;

determining a total configured maximum output power, the total configured maximum output power being based on maximum power requirements for a plurality of configured serving cells associated with the plurality of uplink carriers;

transmitting a device-to-device signal on the first uplink carrier at a first transmit power level if the total transmit power of the UE would exceed the total configured maximum output power, or at a second transmit power level if the total transmit power of the UE would not exceed the total configured maximum output power; and transmitting a set of cellular signals on one or more uplink carriers of the plurality of uplink carriers other than the first uplink carrier at a first set of transmit power levels if the total transmit power of the UE would exceed the total configured maximum output power, or at a second set of transmit power levels if the total transmit power of the UE would not exceed the total configured maximum output power;

wherein the total configured maximum output power is a first total configured maximum output power, the method further comprising:

determining a second total configured maximum output power, the second total configured maximum output power being based on the maximum power requirements for the plurality of configured serving cells except a cell associated with the first uplink carrier;

wherein the first set of transmit power levels of the set of cellular signals is based on one or more of the first and second total configured maximum output powers;

wherein the first transmit power level of the device-to-device signal, $\tilde{P}_{D2D}(i)$, and the first set of transmit power levels of the set of cellular signals, $\tilde{P}_{PUCCH}(i)$, $\tilde{P}_{PUSCH,k}(i)$, and $\tilde{P}_{PUSCH,c}(i)$, for subframe i satisfy inequalities comprising:

$$\sum_{c \ne j, c \ne k} w_1(i) \cdot \hat{P}_{PUSCH,c}(i) + w_2(i) \cdot \hat{P}_{D2D}(i) + w_3(i) \cdot \hat{P}_{PUSCH,k}(i) + w_4(i) \cdot \hat{P}_{PUCCH}(i) \le \hat{P}_{CMAX}(i) \quad (1)$$

and $$\sum_{c \ne j, c \ne k} w_1(i) \cdot \hat{P}_{PUSCH,c}(i) + w_3(i) \cdot \hat{P}_{PUSCH,k}(i) + w_4(i) \cdot \hat{P}_{PUCCH}(i) \le \hat{P}_{CMAX,-i}(i)3; \quad (2)$$

wherein:

$\hat{P}_{PUSCH,c}(i)$ is the linear value of power setting of cellular uplink data channel signal transmission from the first UE to a serving cell c and that does not include uplink control information without power scaling;

$\hat{P}_{D2D}(i)$ is the linear value of power setting of device-to-device signal transmission from the first UE to the second UE without power scaling;

$\hat{P}_{PUSCH,k}(i)$ is the linear value of power setting of cellular uplink data channel signal transmission from the first UE to a serving cell k and that may include uplink control information without power scaling;

$\hat{P}_{PUCCH}(i)$ is the linear value of power setting of cellular uplink control channel signal transmission from the first UE over an uplink control channel without power scaling;

$\hat{P}_{CMAX,i}(i)$ is the linear value of the first total configured maximum output power level;

$\hat{P}_{CMAX,-j}(i)$ is the linear value of the second total configured maximum output power level; and $w_1(i)$, $w_2(i)$, $w_3(i)$ and $w_4(i)$ are power scaling coefficients, wherein:

$\tilde{P}_{PUSCH,c}(i) = w_1(i) \cdot \hat{P}_{PUSCH,c}(i);$ $\tilde{P}_{D2D}(i) = w_2(i) \cdot \hat{P}_{D2D}(i);$ $\tilde{P}_{PUSCH,k}(i) = w_3(i) \cdot \hat{P}_{PUSCH,k}(i);$ $\tilde{P}_{PUCCH}(i) = w_4(i) \cdot \hat{P}_{PUCCH}(i);$ and $0 \le w_1(i), w_2(i), w_3(i), w_4(i) \le 1.$

\* \* \* \* \*

UNITED STATES PATENT AND TRADEMARK OFFICE
CERTIFICATE OF CORRECTION

PATENT NO. : 8,839,362 B2
APPLICATION NO. : 13/782190
DATED : September 16, 2014
INVENTOR(S) : Brandon S. Hoffman It is certified that error appears in the above-identified patent and that said Letters Patent is hereby corrected as shown below:

In The Claims

In Claim 2, column 20, line 16, please change $[\hat{P}_{CMAX,-i}(i)]$ to $[\hat{P}_{CMAX,-i}(i)]$.

In Claim 2, Column 20, line 49, please change $[0 \leq w_1(), w_2(i), w_3(i), w_4(i), \leq 1]$ to $[0 \leq w_1(i), w_2(i), w_3(i), w_4(i), \leq 1]$.

Signed and Sealed this
Fifth Day of May, 2015

Michelle K. Lee
*Director of the United States Patent and Trademark Office*